US007653461B2

(12) United States Patent
Kim

(10) Patent No.: US 7,653,461 B2
(45) **Date of Patent: *Jan. 26, 2010**

(54) ELECTRIC DEVICE WITH CONTROL MEANS FOR CALCULATING FOOD POISONING INDEX OR DEGREE BASED ON WEATHER INFORMATION RECEIVED THROUGH PAGER NETWORK

(75) Inventor: Deog-Hyeon Kim, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 148 days.

This patent is subject to a terminal disclaimer.

(21) Appl. No.: 11/558,007

(22) Filed: Nov. 9, 2006

(65) Prior Publication Data

US 2007/0132579 A1 Jun. 14, 2007

(30) Foreign Application Priority Data

Dec. 12, 2005 (KR) ..................... 10-2005-0122050

(51) Int. Cl.
*G01K 3/00* (2006.01)

(52) U.S. Cl. ................... 700/299; 340/539.28; 374/109

(58) Field of Classification Search ............ 340/539.28, 340/7.48; 702/3; 700/276, 299; 455/414.3; 374/109

See application file for complete search history.

(56) References Cited

U.S. PATENT DOCUMENTS 7,324,874 B2 * 1/2008 Jung, II ...................... 700/276
2004/0043760 A1 * 3/2004 Rosenfeld et al. ........ 455/414.3
2006/0154642 A1 * 7/2006 Scannell, Jr. ............. 455/404.1
2007/0143304 A1 * 6/2007 Min ........................... 707/10

* cited by examiner

*Primary Examiner*—Ryan A Jarrett
(74) *Attorney, Agent, or Firm*—Fish & Richardson P.C.

(57) ABSTRACT

The present invention discloses an electric device with a wireless communication module which receives weather information through a pager network, calculates well-being indexes from the weather information, and provides the well-being indexes to the user by itself and through the other electric devices in a real time. The electric device with the wireless communication module includes a pager receiving module for receiving weather information signals through a pager network, and demodulating weather information from the weather information signals, a storing means for storing well-being index calculation data for calculating well-being indexes from the weather information, a ZigBee transmitting/receiving module for transmitting the weather information or the well-being indexes to the other electric devices by wireless, and a control means for performing an intrinsic function of the electric device, receiving the weather information from the pager receiving module, reading the well-being index calculation data, calculating the well-being indexes according to the well-being index calculation data, and transmitting at least one of the weather information and the well-being indexes to the other electric devices through the ZigBee transmitting/receiving module.

21 Claims, 4 Drawing Sheets

ELECTRIC DEVICE WITH CONTROL MEANS FOR CALCULATING FOOD POISONING INDEX OR DEGREE BASED ON WEATHER INFORMATION RECEIVED THROUGH PAGER NETWORK

TECHNICAL FIELD

The present invention relates to an electric device, and more particularly, to an electric device with a wireless communication module which receives weather information through a pager network, calculates well-being indexes from the weather information, and provides the well-being indexes to the user by itself and through the other electric devices in a real time.

BACKGROUND ART

Well-being literally means a healthy comfortable satisfactory living. This lifestyle coming into vogue in USA has been firstly introduced by foreign license woman magazines, and has been more popular by other media.

According to a dictionary definition, well-being means happiness and welfare. It emphasizes quality of life. The well-being group that is a neologism derived from well-being takes a lifestyle maintaining a healthy mind and body as an index of happiness, not a lifestyle pursuing physical values and reputation.

As the middle and upper class people upholding the anti-war movement and the civil right movement in USA accepted naturalism and new age culture against the highly-advanced civilization, well-being emerged as a lifestyle.

As a part of this lifestyle, there is a growing interest in health. For a healthy life, it is necessary to provide information for activities and living on the basis of an indoor or outdoor temperature and/or humidity. Such information includes a food poisoning index and a deterioration index.

The food poisoning index will now be explained. The food poisoning is 'a kind of sickness by ingestion of food'. Mechanical and physical sickness by ingestion of alien substances does not belong to the food poisoning. Generally, the food poisoning means 'sickness by microorganisms bonded to food or mixed or residual toxic substances'. The food poisoning index is a ratio of a time causing the food poisoning in the optimum conditions to a time causing the food poisoning at each temperature.

The deterioration index will now be explained. Deterioration of materials is dependent upon a chemically biologically complicated process. It is difficult to define deterioration of materials simply with weather elements. Nevertheless, the temperature and humidity considerably influence deterioration of materials. For example, both chemical corrosion rusting iron and organic deterioration growing molds need the humid air. When relative humidity is below 65%, deterioration does not occur or is very slow. When the relative humidity exceeds 65% and the temperature rises, deterioration is very fast. The deterioration index shows the degree of deterioration.

Hereinafter, the food poisoning index and the deterioration index are defined as well-being indexes.

To obtain the well-being indexes, the user must additionally buy a device for measuring the temperature and/or humidity and calculating the well-being indexes from the temperature and/or humidity.

DISCLOSURE OF THE INVENTION

The present invention is achieved to solve the above problems. An object of the present invention is to provide an electric device with a wireless communication module which is installed in a house or office, for calculating well-being indexes according to weather information signals received through a pager network, and providing the well-being indexes to the user in a real time.

Another object of the present invention is to provide an electric device with a wireless communication module which is installed in a house or office, for calculating and displaying well-being indexes without incurring additional expenses.

Yet another object of the present invention is to provide an electric device with a wireless communication module which calls the user's attention by visibly and/or audibly providing well-being indexes.

Yet another object of the present invention is to provide an electric device with a wireless communication module which rapidly provides weather information and well-being indexes to the user from various points, by transmitting the weather information and the well-being indexes to the adjacent electric devices through a ZigBee transmitting/receiving module.

In order to achieve the above-described objects of the invention, there is provided an electric device with a wireless communication module, including: a pager receiving module for receiving weather information signals through a pager network, and demodulating weather information from the weather information signals; a storing means for storing well-being index calculation data for calculating well-being indexes from the weather information; a ZigBee transmitting/receiving module for transmitting the weather information or the well-being indexes to the other electric devices by wireless; and a control means for performing an intrinsic function of the electric device, receiving the weather information from the pager receiving module, reading the well-being index calculation data, calculating the well-being indexes according to the well-being index calculation data, and transmitting at least one of the weather information and the well-being indexes to the other electric devices through the ZigBee transmitting/receiving module.

Preferably, the electric device further includes a display means for displaying the weather information or the well-being indexes, and the control means displays at least one of the weather information and the well-being indexes on the display means.

Preferably, the well-being indexes include at least one of a food poisoning index, a food poisoning degree corresponding to the food poisoning index, and an estimated deterioration time.

Preferably, the well-being indexes include at least one of a deterioration index, and a deterioration degree corresponding to the deterioration index.

Preferably, the control means divides range of the well-being indexes into a few stages, and displays the stage corresponding to the well-being indexes on the display means.

Preferably, the electric device includes a switch for selecting calculation and display of the well-being indexes or transmission of the well-being indexes, and the control means calculates and displays or transmits the well-being indexes according to selection of the switch.

Preferably, the other electric devices are information home appliances such as a refrigerator and an air-conditioner.

According to another aspect of the present invention, there is provided an electric device with a wireless communication module, including: a pager receiving module for receiving weather information signals through a pager network, and demodulating weather information from the weather information signals; a ZigBee transmitting/receiving module for transmitting the weather information or well-being indexes to the other electric devices; and a control module for controlling the electric device, displaying the state of the electric device, and transmitting at least one of the weather information and the well-being indexes to the other electric devices through the ZigBee transmitting/receiving module, the control module including an operation unit for calculating the well-being indexes from the weather information according to well-being index calculation data.

According to yet another aspect of the present invention, there is provided a weather information sharing system, including: a first electric device including: a pager receiving module for receiving weather information signals through a pager network, and demodulating weather information from the weather information signals; a first ZigBee transmitting/receiving module for transmitting the weather information or well-being indexes to a second electric device; and a first control module for controlling the first electric device, displaying the state of the first electric device, and transmitting at least one of the weather information and the well-being indexes to the second electric device through the first ZigBee transmitting/receiving module, the first control module including an operation unit for calculating the well-being indexes from the weather information according to well-being index calculation data; and a second electric device including: a second ZigBee transmitting/receiving module for receiving the weather information or the well-being indexes from the first electric device; and a second control module including a second display unit for displaying the weather information or the well-being indexes, and displaying at least one of the weather information and the well-being indexes on the second display unit.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

The present invention will now be described in detail on the basis of preferred embodiments and accompanying drawings. However, it is recognized that the scope of the present invention should not be limited to these embodiments and drawings but to the claims as hereinafter recited.

Figure 1:
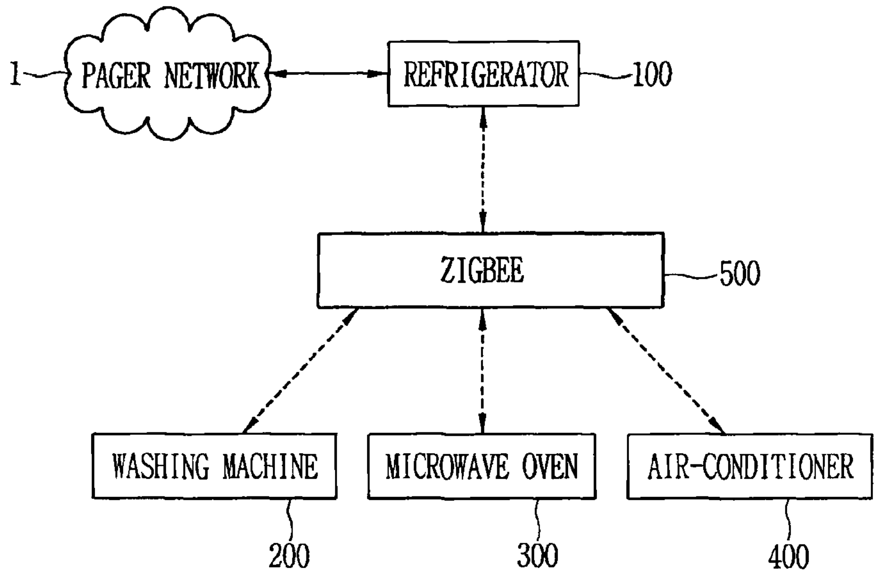
FIG. 1 is a block diagram illustrating a weather information sharing system including electric devices with wireless communication modules in accordance with the present invention.

FIG. 1 is a block diagram illustrating a weather information sharing system including electric devices with wireless communication modules in accordance with the present invention.

Referring to FIG. 1, the weather information sharing system includes a refrigerator 100 that is an electric device for receiving weather information signals through a pager network 1, demodulating weather information from the weather information signals, calculating well-being indexes according to the weather information, and transmitting at least one of the weather information and the well-being indexes to the other electric devices 200, 300 and 400 through ZigBee communication 500, and a washing machine 200, a microwave oven 300 and an air-conditioner 400 that are electric devices for receiving and displaying at least one of the weather information and the well-being indexes through ZigBee communication 500.

The refrigerator 100 includes at least a pager receiving module (explained later) for receiving the weather information signals through the pager network 1. In addition, the refrigerator 100, the washing machine 200, the microwave oven 300 and the air-conditioner 400 include at least ZigBee transmitting/receiving modules (explained later) for ZigBee communication 500.

The electric devices 100, 200, 300 and 400 are information home appliances which perform their intrinsic functions and provide at least one of the weather information and the well-being indexes to the user at the same time. Therefore, the electric devices 100, 200, 300 and 400 each respectively include at least a display unit for displaying the weather information and the well-being indexes, and an output unit for outputting an alarm.

The pager network 1 is a general pager communication network. ZigBee communication 500 is local area wireless communication based on IEEE 802.15.4. ZigBee communication 500 conforms to a communication protocol using simple modulation based on a spread spectrum technology.

Figure 2:
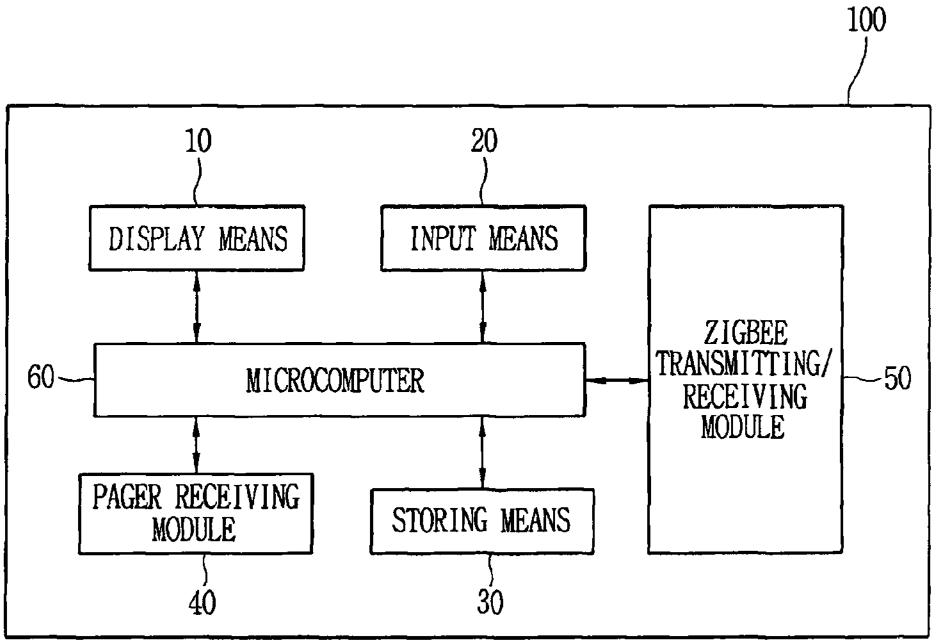
FIG. 2 is a block diagram illustrating the electric device with the wireless communication module in accordance with the present invention.
Figure 3:
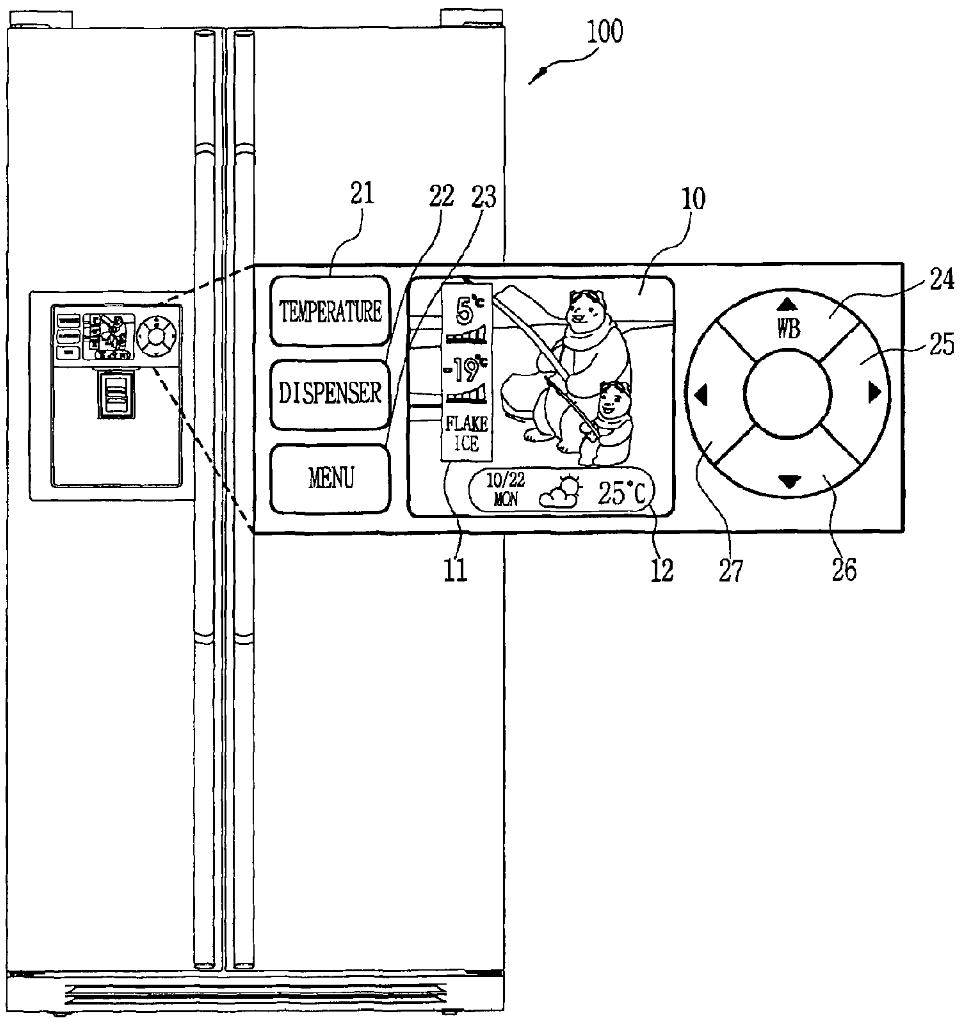
FIG. 3 is a structure diagram illustrating one example of the electric device of FIG. 2.

FIG. 2 is a block diagram illustrating the electric device with the wireless communication module in accordance with the present invention, and FIG. 3 is a structure diagram illustrating one example of the electric device of FIG. 2.

The refrigerator 100 is exemplified as the electric device with the wireless communication module. The present invention can also be applied to the other information home appliances (air-conditioner, microwave oven, washing machine, etc.).

As illustrated in FIGS. 2 and 3, the refrigerator 100 includes a display means 10 for displaying a user interface, the weather information, the well-being indexes and a standby screen according to standby screen information (for example, information which includes an avatar or basic information such as a set temperature of a freezing chamber, a set temperature of a refrigerating chamber and a service type of a dispenser and which may include the weather information), an input means 20 for receiving a command from the user, a storing means 30 for storing the user interface, the standby screen information, the weather information, and well-being index calculation data for calculating the well-being indexes from the weather information, a pager receiving module 40 for receiving weather information signals from an external source, and demodulating the weather information from the weather information signals, a ZigBee transmitting/receiving module 50 for transmitting at least one of the weather information and the well-being indexes to the other electric devices 200, 300 and 400 through ZigBee communication, and a microcomputer 60 for receiving the weather information from the pager receiving module 40, reading the well-being index calculation data from the storing means 30, displaying the well-being indexes on the display means 10, and transmitting at least one of the weather information and the well-being indexes to the other electric devices 200, 300 and 400 through the ZigBee transmitting/receiving module 50. The refrigerator 100 can further include a main microcomputer (not shown) for performing freezing and refrigerating control operations. Here, a communication line is connected between the main microcomputer and the microcomputer 60 for data communication. On the other hand, the refrigerator 100 can perform freezing and refrigerating control operations through the microcomputer 60. In addition, the refrigerator 100 includes a power supply means (not shown) for supplying power to each element.

In detail, the display means 10 is a color TFT LCD for displaying the user interface, the standby screen, the weather information and the well-being indexes. The user interface can be a background displaying an avatar. Also, the user interface can further display the state information of the refrigerator 100 simultaneously with or individually from the avatar (refer to FIG. 3). As shown in FIG. 3, the display means 10 displays the avatar (bear), the basic information 11 of the refrigerator 100 and the weather information 12 (or weather condition of the day) as the standby screen. Display of the well-being indexes will be explained later. Here, the display means 10 includes a visible display unit (not shown) for visibly displaying information, and an audible output unit (not shown) for audibly outputting information or warning.

The input means 20 is not only a means for controlling the general operation of the refrigerator 100, but also a means for receiving a user input for selecting the avatar, displaying the weather information, requesting the well-being indexes (display request), setting an area code of the pager receiving module 40, and transmitting the weather information and the well-being indexes through ZigBee communication, and transmitting a proper command to the microcomputer 60. The input means 20 can be formed in a button type, a touch pad type or an electrostatic type.

Still referring to FIG. 3, the input means 20 includes a temperature setting means 21 for setting the temperature of the freezing chamber and the temperature of the refrigerating chamber, a dispenser setting means 22 for setting the service type of the dispenser (cube type ice, water, flake ice, etc.), a menu means 23 for activating and selecting the user interface displayed on the display means 10, a well-being index requesting means 24 for calculating the well-being indexes from the weather information and displaying the well-being indexes, and means 25, 26 and 27 for selecting other functions (transmission of the weather information and the well-being indexes by ZigBee communication, activation of a mike, activation of an indoor lamp of the refrigerator 100, locking of the input means 20, etc.). Here, the well-being index requesting means 24 and the means 25, 26 and 27 for requesting transmission of the weather information and the well-being indexes by ZigBee communication can be selected by the user interface activated by the menu means 23.

The storing means 30 stores the user interface for controlling the general refrigerator operations, the standby screen information, the weather information, the well-being index calculation data and the calculated well-being indexes. As shown in FIG. 3, the standby screen information includes the avatar that is a background image and the basic information 11 of the refrigerator 100. In the standby mode, the microcomputer 60 reads and displays the standby screen information. In addition, still referring to FIG. 3, the standby screen information can include the weather information 12.

The weather information stored in the storing means 30 includes weather forecast information, and weather condition information measured or observed in regard to a generated atmospheric phenomenon. The weather forecast information includes future weather condition information obtained on the basis of a weather chart or other data. The weather condition (or weather) means various atmospheric phenomena. The detailed range (factors) of the atmospheric phenomena includes pressure, temperature (highest temperature, lowest temperature, average temperature, etc.), wet-bulb temperature, steam pressure, dew point temperature, relative humidity, wind direction, wind velocity, precipitation, cloud, evaporation loss, sunshine duration, solar radiation, rainfall frequency, and other phenomena. In accordance with the present invention, the weather information demodulated from the weather information signals can include the atmospheric phenomena of the following Table 1.

TABLE 1

| Weather condition (information) | Explanation |
|---|---|
| Current temperature | Current temperature in specific areas |
| Estimated highest/lowest temperature of next 5 days | Estimated temperature and estimated rainfall |
| Estimated weather of next 5 days | Cloudy, rainy, snowy, windy, etc. |
| Wind velocity of next 5 days | Average wind velocity (mph) |
| Wind direction of next 5 days | Wind direction |
| Wave height | Wave height in specific areas |
| Effective temperature | Factors by wind velocity, UV and humidity |
| Highest/lowest effective temperature of next 5 days | Factors by wind velocity, UV and humidity |
| UV index of next 5 days | UV index |
| Humidity of next 5 days | Humidity |
| Precipitation | Current total precipitation (mm, inch) |

TABLE 1-continued

| Weather condition (information) | Explanation |
|---|---|
| Current visibility | Visible distance (km. mile) |
| Pressure | Mercury pressure |

On the other hand, the well-being index calculation data stored in the storing means 30 are data for calculating a food poisoning index and a deterioration index by using temperature and/or humidity as parameters. The well-being index calculation data include a food poisoning degree corresponding to the food poisoning index and/or an estimated deterioration time, and a deterioration degree corresponding to the deterioration index.

Table 2 shows the well-being index calculation data for the food poisoning index.

TABLE 2

| Temperature (° C.) | Growth speed ($hr^{-1}$) | Multiplication time (hr) | Food poisoning causing time (hr) | Food poisoning index |
|---|---|---|---|---|
| 40 | 1.98 | 0.35 | 3.5 | 100 |
| 39 | 1.95 | 0.36 | 3.6 | 98 |
| 38 | 1.92 | 0.36 | 3.6 | 97 |
| 37 | 1.85 | 0.37 | 3.7 | 93 |
| 36 | 1.8 | 0.39 | 3.9 | 91 |
| 35 | 1.7 | 0.41 | 4.1 | 86 |
| 34 | 1.6 | 0.43 | 4.3 | 81 |
| 33 | 1.45 | 0.48 | 4.8 | 73 |
| 32 | 1.35 | 0.51 | 5.1 | 68 |
| 31 | 1.2 | 0.58 | 5.8 | 61 |
| 30 | 1.05 | 0.66 | 6.6 | 53 |
| 29 | 1 | 0.69 | 6.9 | 51 |
| 28 | 0.9 | 0.77 | 7.7 | 45 |
| 27 | 0.8 | 0.87 | 8.7 | 40 |
| 26 | 0.7 | 0.99 | 9.9 | 35 |
| 25 | 0.6 | 1.16 | 11.6 | 30 |
| 24 | 0.55 | 1.26 | 12.6 | 28 |
| 23 | 0.475 | 1.46 | 14.6 | 24 |
| 22 | 0.4 | 1.73 | 17.3 | 20 |
| 21 | 0.35 | 1.98 | 19.8 | 18 |
| 20 | 0.25 | 2.77 | 27.7 | 13 |
| 19 | 0.2 | 3.47 | 34.7 | 10 |
| 18 | 0.18 | 3.85 | 38.5 | 9 |
| 17 | 0.15 | 4.62 | 46.2 | 8 |
| 16 | 0.12 | 5.78 | 57.8 | 6 |
| 15 | 0.1 | 6.93 | 69.3 | 5 |

Range of the food poisoning index can be divided into four stages according to its size. Table 3 shows the food poisoning degree and/or the estimated deterioration time corresponding to the food poisoning indexes.

TABLE 3

| Index range | Notices |
|---|---|
| Over 86 | Deteriorated within 3 to 4 hours, Very careful handling of food is needed, High possibility of food poisoning |
| 50-85 | Deteriorated within 4 to 6 hours, Careful handling of cooking utensils is needed, Relatively high possibility of food poisoning |
| 35-50 | Possibility of food poisoning within 6 to 11 hours, Beware of food poisoning |
| 10-35 | Possibility of food poisoning, Careful handling of food is needed |

The deterioration index is calculated on the basis of the well-being index calculation data of the following formula 1:

Formula 1

$$DI = \frac{(H - 65)(1.054)^t}{14}$$

Here, 'H' represents daily average relative humidity (%) and 't' represents daily average temperature (° C.).

Range of the deterioration index is divided into three stages according to its size. Table 4 shows the resultant deterioration degree.

TABLE 4

| Deterioration index | Degree |
|---|---|
| 0-3 | Slightly deteriorated |
| 3-7 | Deteriorated |
| 7-10 | Seriously deteriorated |

The storing means 30 further stores a user request data including selection of calculation and display of the well-being indexes, and the microcomputer 60 calculates and displays the well-being indexes according to the data. The user request data can be set and changed by the user input from the input means 20. In addition, the user request data can further include selection of transmission of at least one of the weather information and the well-being indexes to the other electric devices 200, 300 and 400 by ZigBee communication.

The pager receiving module 40 receives data through the pager network. The data are the weather information signals coded to have the weather information. The pager receiving module 40 receives the weather information signals having a relatively small size. The pager receiving module 40 can be connected to the microcomputer 60 by a connector as a single component, or mounted on a single substrate including the microcomputer 60. The pager receiving module 40 demodulates the weather information signals and transmits the weather information to the microcomputer 60. Preferably, even if the pager receiving module 40 is not mounted, the microcomputer 60 can normally perform other functions. The pager receiving module 40 can receive only the weather information signals corresponding to a specific area code, by receiving an identifiable area code and performing area setting (for example, by activating the user interface for area code or area setting by the input means 20). A general receiver for receiving data through the pager network can be used as the pager receiving module 40.

The ZigBee transmitting/receiving module 50 is a module for performing near field communication in ZigBee standard. The ZigBee transmitting/receiving module 50 supports 16 channels in a frequency band of 2.4 GHz, uses a Direct Sequence Spread Spectrum (DSSS) modem type, and has a data transmission speed of 20 kbps to 250 kbps. Although performing communication on the basis of a master-slave type, the ZigBee transmitting/receiving module 50 can support point-to-point networking. The ZigBee transmitting/receiving module 50 transmits or receives at least one of the weather information and the well-being indexes in accordance with ZigBee communication agreement under the control of the microcomputer 60.

The microcomputer 60 reads the standby screen information including the avatar selected by the user or the automatically-set (default) avatar and the basic information 11 of the refrigerator 100 from the storing means 40, and displays the standby screen on the display means 10 (refer to FIG. 3).

In addition, the microcomputer 60 stores the weather information 12 in the storing means 30 or displays the weather information 12 on the displays means 10 through the pager receiving module 40.

In the standby mode in which the user does not use the refrigerator 100 (for example, the user does not input a command through the menu means 23 or reset the temperature inside the refrigerating chamber or the freezing chamber), the microcomputer 60 displays the standby screen on the display means 10. Also, the microcomputer 60 reads the weather information from the storing means 30, and displays the weather information on the display means 10 with the standby screen. If the user uses the refrigerator 100, the microcomputer 60 temporarily stops displaying the standby screen or the weather information on the display means 10, and displays the user interface on the display means 10 due to the limited size of the display means 10. The control process of the microcomputer 60 in relation to the well-being indexes and the process for transmitting the well-being indexes and the weather information to the other electric devices 200, 300 and 400 will now be described.

Figure 4:
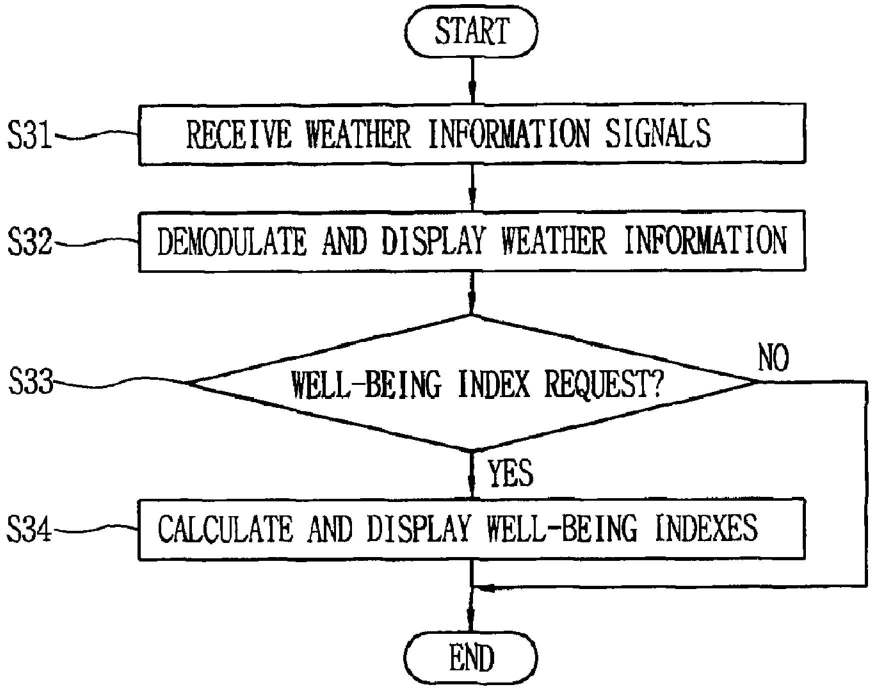
FIG. 4 is a flowchart showing a process for displaying well-being indexes in the electric device with the wireless communication module in accordance with the present invention.

FIG. 4 is a flowchart showing the process for displaying the well-being indexes in the electric device with the wireless communication module in accordance with the present invention.

The following steps are performed in a state where area code or area setting of the pager receiving module 40 has been executed.

In S31, the pager receiving module 40 receives the weather information signals through the pager network. Here, the pager receiving module 40 can receive only the weather information signals corresponding to the set area code.

In S32, the pager receiving module 40 demodulates the weather information from the weather information signals. Here, the pager receiving module 40 can demodulate only the weather information corresponding to the set area code. The step for selectively receiving or demodulating the weather information signals or the weather information corresponding to the set area code can be selectively performed in S31 or S32. Therefore, the microcomputer 60 receives the weather information from the pager receiving module 40, stores the weather information in the storing means 30, and displays the weather information on the display means 10 as shown in FIG. 3.

In S33, the microcomputer 60 reads the user request data stored in the storing means 30, and decides whether the user requests calculation and display of the well-being indexes. If the user requests calculation and display of the well-being indexes, the routine goes to S34, and if not, the routine is ended.

In S34, the microcomputer 60 calculates the well-being indexes (food poisoning index, deterioration index, etc.) by operating the weather information according to the well-being index calculation data stored in the storing means 30, stores the well-being indexes in the storing means 30, and displays the well-being indexes on the display means 10.

In S34, the microcomputer 60 can display the calculated well-being indexes on the display means 10 by using characters, figures or avatars according to the above stage or degree of the well-being indexes. In case each index shows a high degree, for example, in case the estimated deterioration time is short, the microcomputer 60 notifies the degree or outputs an alarm through an audible output unit (for example, speaker) of the display means 10 in order to rapidly arouse the user's interest.

Figure 5:
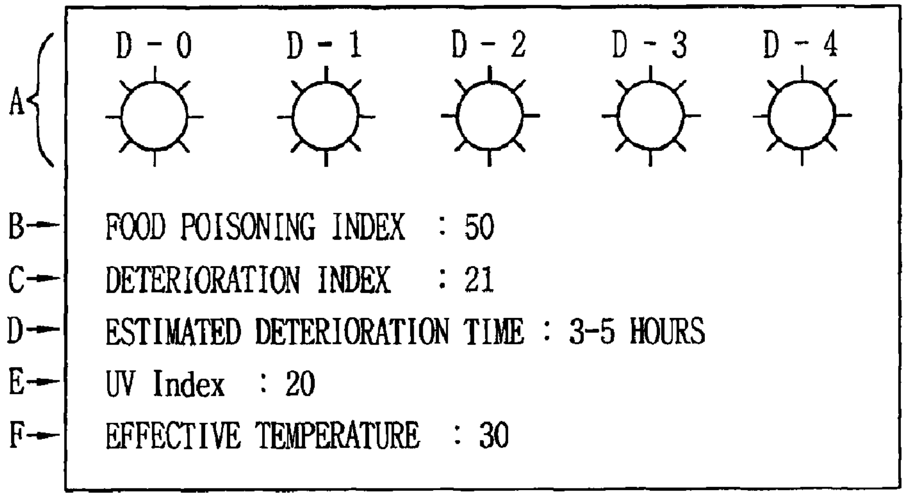
FIG. 5 is an exemplary diagram illustrating the weather information and the well-being indexes displayed on a display means.

FIG. 5 is an exemplary diagram illustrating the weather information and the well-being indexes displayed on the display means 10. As depicted in FIG. 5, the microcomputer 60 can simultaneously display the weather information A, E and F and the well-being indexes B, C and D on the display means 10. As described above, the microcomputer 60 also displays characters and outputs an alarm. Such a display operation can be performed when the user presses the input means 20 or at predetermined intervals.

Figure 6:
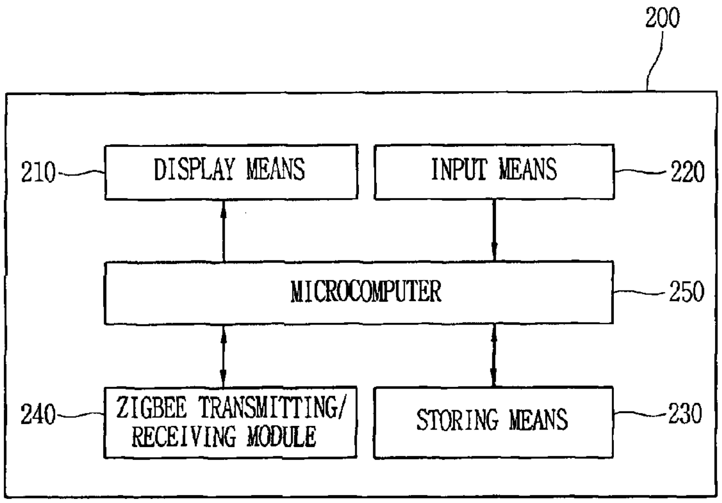
FIG. 6 is a block diagram illustrating another example of the electric device of FIG. 1.

FIG. 6 is a block diagram illustrating another example of the electric device of FIG. 1. FIG. 6 is a schematic structure diagram illustrating the electric device 200 of FIG. 1. The other electric devices 300 and 400 have a similar structure.

The washing machine 200 includes a display means 210 for displaying the washing and drying operations, the weather information and the well-being indexes, an input means 220 for receiving an input from the user, a storing means 230 for storing a user request data relating to reception and display of the weather information and the well-being indexes, a ZigBee transmitting/receiving module 240 for receiving the weather information and the well-being indexes through ZigBee communication 500, and a microcomputer 250 for performing the washing and drying operations, and displaying at least one of the weather information and the well-being indexes from the ZigBee transmitting/receiving module 240 on the display means 210. The other constitutional elements for the washing and drying operations will not be explained.

Here, the display means 210 and the input means 220 are almost identical to the display means 10 and the input means 20 of FIG. 2, except that the input means 20 further obtains the user input for receiving and displaying the weather information and the well-being indexes from the refrigerator 100 (and selecting and displaying at least one of the weather information and the well-being indexes). The storing means 230 stores the user request data having the user input. The ZigBee transmitting/receiving module 240 is identical to the ZigBee transmitting/receiving module 50 of FIG. 2.

The microcomputer 250 displays at least one of the weather information and the well-being indexes received through the ZigBee transmitting/receiving module 240 on the display means 210 according to the user request data stored in the storing means 230.

Figure 7:
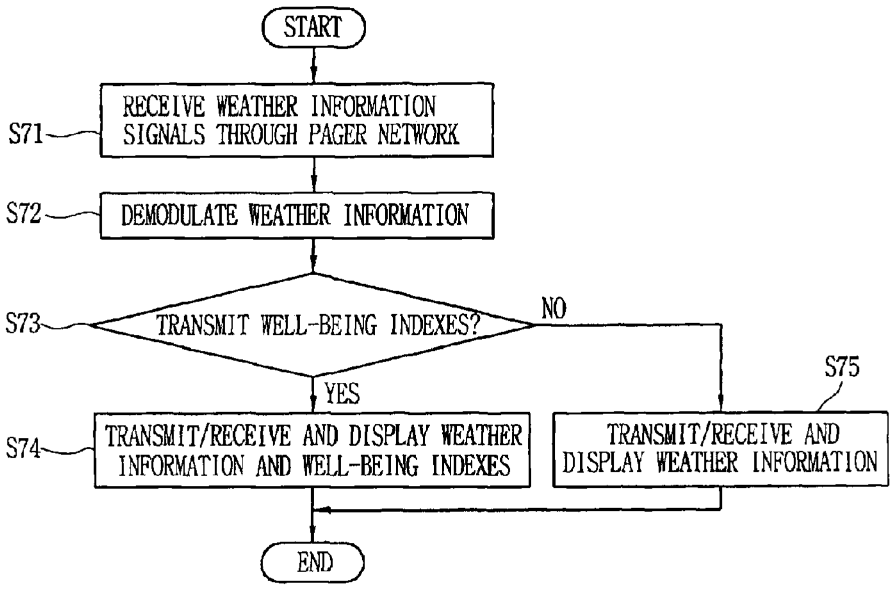
FIG. 7 is a flowchart showing a method for sharing the weather information and the well-being indexes in the weather information sharing system of FIG. 1.

FIG. 7 is a flowchart showing a method for sharing the weather information and the well-being indexes in the weather information sharing system of FIG. 1.

S71 and S72 are identical to S31 and S32 of FIG. 4.

In S73, the microcomputer 60 of the refrigerator 100 reads the user request data from the storing means 30, and confirms transmission setting of the well-being indexes. If transmission setting exists, the routine goes to S74, and if not, the routine goes to S75.

In S74, the microcomputer 60 of the refrigerator 100 calculates the well-being indexes according to the well-being index calculation data, and transmits the weather information and the well-being indexes to the other electric devices 200, 300 and 400 through the ZigBee transmitting/receiving module 50. Here, the well-being indexes may be identical to the well-being indexes calculated in S34 of FIG. 4. Therefore, the electric devices 200, 300 and 400 respectively receive the weather information and the well-being indexes through their ZigBee transmitting/receiving modules, and display at least one of the weather information and the well-being indexes according to the user request data or default.

In S75, the microcomputer 60 of the refrigerator 100 transmits the weather information to the other electric devices 200, 300 and 400 through the ZigBee transmitting/receiving module 50 without calculating the well-being indexes. The electric devices 200, 300 and 400 receive the weather information through their ZigBee transmitting/receiving modules and display the weather information, respectively.

The flowchart of FIG. 7 can further include a step for transmitting only the well-being indexes.

As discussed earlier, in accordance with the present invention, the electric device with the wireless communication module is installed in the house or office, for calculating the well-being indexes according to the weather information signals received through the pager network, and providing the well-being indexes to the user in a real time.

In addition, the electric device with the wireless communication module is installed in the house or office, for calculating and displaying the well-being indexes without incurring additional expenses.

Furthermore, the electric device with the wireless communication module calls the user's attention by visibly and/or audibly providing the well-being indexes.

Finally, the electric device with the wireless communication module rapidly provides the weather information and the well-being indexes to the user from various points, by transmitting the weather information and the well-being indexes to the adjacent electric devices through the ZigBee transmitting/receiving module.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An electric device with a wireless communication module, comprising:

a pager receiving module configured to receive weather information signals through a pager network, and demodulate weather information based on the weather information signals;

a storing means for storing well-being index calculation data used to calculate well-being indexes based on the weather information, wherein the well-being indexes include at least one of a food poisoning index and a food poisoning degree corresponding to the food poisoning index;

a transmitting/receiving module configured to transmit at least one of the weather information and the well-being indexes to other electric devices by wireless communication; and a control means for performing an intrinsic function of the electric device, receiving the weather information from the pager receiving module, reading the well-being index calculation data stored on the storing means, calculating the well-being indexes based on the well-being index calculation data, and controlling transmission of at least one of the weather information and the well-being indexes to the other electric devices through the transmitting/receiving module.

2. The electric device of claim 1, further comprising a display means for displaying at least one of the weather information and the well-being indexes, wherein the control means controls display of the at least one of the weather information and the well-being indexes on the display means.

3. The electric device of claim 2, wherein the control means comprises control means for dividing a range of the well-being indexes into a few stages, and controlling display of the at least one stage corresponding to the well-being indexes on the display means.

4. The electric device of claim 1, wherein the well-being indexes further comprise corresponding an estimated deterioration time.

5. The electric device of claim 1, wherein the well-being indexes further comprise at least one of a deterioration index, and a deterioration degree corresponding to the deterioration index.

6. The electric device of claim 1, further comprising a switch configured to select calculation and display of the well-being indexes or transmission of the well-being indexes, wherein the control means comprises control means for calculating and controlling display of or controlling transmission of the well-being indexes according to selection of the switch.

7. The electric device of claim 1, wherein the other electric devices comprise home appliances.

8. The electric device of claim 1, wherein the transmitting/receiving module comprises a ZigBee transmitting/receiving module.

9. An electric device with a wireless communication module, comprising:

a pager receiving module configured to receive weather information signals through a pager network, and demodulate weather information based on the weather information signals;

a transmitting/receiving module configured to transmit at least one of the weather information and well-being indexes to other electric devices, wherein the well-being indexes include at least one of a food poisoning index and a food poisoning degree corresponding to the food poisoning index; and a control module configured to control the electric device, control display of a state of the electric device, and control transmission of at least one of the weather information and the well-being indexes to the other electric devices through the transmitting/receiving module, the control module including an operation unit configured to calculate the well-being indexes based on the weather information according to well-being index calculation data.

10. The electric device of claim 9, further comprising a display unit configured to display at least one of the weather information and the well-being indexes, wherein the control module is configured to control display of the at least one of the weather information and the well-being indexes on the display unit.

11. The electric device of claim 10, wherein the display unit is configured to display the well-being indexes by stages.

12. The electric device of claim 9, wherein the well-being indexes further comprise an estimated deterioration time.

13. The electric device of claim 9, wherein the well-being indexes further comprise at least one of a deterioration index, and a deterioration degree corresponding to the deterioration index.

14. The electric device of claim 9, wherein the transmitting/receiving module comprises a ZigBee transmitting/receiving module.

15. A weather information sharing system, comprising:

a first electric device including:

a pager receiving module configured to receive weather information signals through a pager network, and demodulate weather information based on the weather information signals;

a first transmitting/receiving module configured to transmit at least one of the weather information and well-being indexes to a second electric device, wherein the well-being indexes include at least one of a food poisoning index and a food poisoning degree corresponding to the food poisoning index; and a first control module configured to control the first electric device, control display of a state of the first electric device, and control transmission of at least one of the weather information and the well-being indexes to the second electric device through the first transmitting/receiving module, the first control module including an operation unit configured to calculate the well-being indexes based on the weather information according to well-being index calculation data; and a second electric device including:

a second transmitting/receiving module configured to receive the at least one of the weather information and the well-being indexes from the first electric device; and a second control module configured to control display of the at least one of the weather information and the well-being indexes on a second display unit.

16. The system of claim 15, further comprising a first display unit configured to display at least one of the weather information and the well-being indexes, wherein the first control module is configured to control display of the at least one of the weather information and the well-being indexes on the first display unit.

17. The system of claim 16, wherein at least one of the first display unit and the second display unit is configured to display the well-being indexes according to a few stages.

18. The system of claim 15, wherein the well-being indexes further comprise corresponding an estimated deterioration time.

19. The system of claim 15, wherein the well-being indexes comprise at least one of a deterioration index, and a deterioration degree corresponding to the deterioration index.

20. The system of claim 15, wherein:

the first transmitting/receiving module comprises a first ZigBee transmitting/receiving module, and the second transmitting/receiving module comprises a second ZigBee transmitting/receiving module.

21. The system of claim 15, further comprising the second display unit configured to display the at least one of the weather information and the well-being indexes.

* * * * *